US011592330B2

(12) United States Patent
Tang et al.

(10) Patent No.: US 11,592,330 B2
(45) Date of Patent: Feb. 28, 2023

(54) PIXEL CIRCUIT HAVING CAPACITOR WITH IDENTICAL ELECTRODES TO IMPROVE SENSING EFFICIENCY AND OPERATING METHOD THEREOF

(71) Applicant: PixArt Imaging Inc., Hsin-Chu County (TW)

(72) Inventors: Kuan Tang, Hsin-Chu County (TW); Yi-Cheng Chiu, Hsin-Chu County (TW); Chia-Chi Kuo, Hsin-Chu County (TW); Jui-Te Chiu, Hsin-Chu County (TW); Han-Chi Liu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 17/474,770

(22) Filed: Sep. 14, 2021

(65) Prior Publication Data

US 2021/0404871 A1 Dec. 30, 2021

Related U.S. Application Data

(62) Division of application No. 16/410,214, filed on May 13, 2019, now Pat. No. 11,287,316.

(30) Foreign Application Priority Data

May 25, 2018 (TW) .................................. 10711792.9

(51) Int. Cl.
*G01J 1/46* (2006.01)
*G01J 1/44* (2006.01)

(52) U.S. Cl.
CPC ........... *G01J 1/46* (2013.01); *G01J 2001/446* (2013.01)

(58) Field of Classification Search
CPC ..... G01J 1/46; G01J 2001/446; H04N 5/3559
See application file for complete search history.

(56) References Cited

U.S. PATENT DOCUMENTS

| | | |
|---|---|---|
| 6,317,154 B2 | 11/2001 | Beiley |
| 9,565,375 B1 | 2/2017 | Raynor et al. |
| 2005/0265515 A1 | 12/2005 | Tashiro et al. |
| 2009/0256060 A1 | 10/2009 | Meynants et al. |
| 2012/0312967 A1 | 12/2012 | De Wit et al. |
| 2016/0020235 A1* | 1/2016 | Yamashita ........ H01L 27/14641 250/206 |
| 2019/0028664 A1 | 1/2019 | Ishii |
| 2019/0356870 A1 | 11/2019 | Shigeta |
| 2020/0329208 A1 | 10/2020 | Ando et al. |

* cited by examiner

*Primary Examiner* — Thanh Luu
*Assistant Examiner* — Monica T Taba
(74) *Attorney, Agent, or Firm* — WPAT, PC

(57) ABSTRACT

There is provided a circuit to improve the sensing efficiency of pixels that uses the induction effect of a capacitor to duplicate a voltage deviation caused by additional electrons and uses a circuit to cancel out the voltage deviation during reading pixel data thereby improving the sensing efficiency.

15 Claims, 13 Drawing Sheets

|  | Transistor 12 | Transistor 11 | Transistor 15 |
|---|---|---|---|
| Phase I | ON | ON | ON |
| Phase II | OFF | ON | OFF |
| Phase III | OFF | OFF | OFF |
| Phase IV | OFF | OFF | OFF |
| Phase V | ON | OFF | OFF |

FIG. 1B

|  | Transistor 24 | Transistor 21 | Transistor 25 |
| --- | --- | --- | --- |
| Phase I | ON | ON | ON |
| Phase II | ON | ON | OFF |
| Phase III | OFF | OFF | OFF |
| Phase IV | OFF | ON | ON |
| Phase V | OFF | ON | ON |
| Phase VI | ON | ON | ON |
| Phase VII | ON | ON | ON |

|  | transistor34 | transistor341 | transistor31 | transistor35 |
|---|---|---|---|---|
| Phase I | ON | ON | ON | ON |
| Phase II | ON | OFF | ON | OFF |
| Phase III | OFF | OFF | OFF | OFF |
| Phase IV | OFF | ON | OFF | OFF |
| Phase V | OFF | ON | OFF | OFF |
| Phase VI | ON | OFF | ON | ON |
| Phase VII | OFF | ON | OFF | ON |
| Phase VIII | OFF | ON | OFF | ON |

|  | Transistor 44 | Transistor 41 | Transistor 45 |
| --- | --- | --- | --- |
| Phase I | ON | ON | ON |
| Phase II | ON | ON | OFF |
| Phase III | OFF | OFF | OFF |
| Phase IV | ON | OFF | OFF |
| Phase V | ON | ON | ON |
| Phase VI | ON | OFF | OFF |

|  | 51 | 54 | 58 |
|---|---|---|---|
| mode I | on/off | on/off | on/off |
| mode II | on/off | on/off | always ON |
| mode III | always ON | on/off | on/off |
| mode IV | always ON | always OFF | always ON |

| Vref | 61A | 61B | 68A | 68B | 64A | 64B | 65 |
|---|---|---|---|---|---|---|---|
| phase I | L | OFF | OFF | OFF | OFF | ON | ON | ON |
| phase II | L | OFF | OFF | OFF | OFF | ON | ON | OFF |
| phase III | H | ON | ON | OFF | OFF | ON | ON | OFF |
| phase IV | L | OFF | OFF | OFF | ON | ON | ON | OFF |
| phase V | L | OFF | OFF | OFF | OFF | ON | ON | OFF |
| phase VI | H | OFF | OFF | OFF | OFF | ON | ON | OFF |
| phase VII | H | ON | ON | OFF | OFF | OFF | OFF | OFF |
| phase VIII | H | OFF | OFF | OFF | OFF | OFF | OFF | OFF |
| phase IX | H | OFF | OFF | OFF | OFF | OFF | OFF | OFF |

FIG. 6B

PIXEL CIRCUIT HAVING CAPACITOR WITH IDENTICAL ELECTRODES TO IMPROVE SENSING EFFICIENCY AND OPERATING METHOD THEREOF

RELATED APPLICATIONS

The present application is a divisional application of U.S. application Ser. No. 16/410,214, filed on May 13, 2019, and claims priority to Taiwanese Application Number 107117929, filed May 25, 2018, the disclosures of which are hereby incorporated by reference herein in their entirety.

BACKGROUND

1. Field of the Disclosure

This disclosure generally relates to a circuit to improve sensing efficiency of pixels that duplicate a voltage deviation caused by additional electrons using the capacitive sensing or an adjacent pixel. The voltage deviation is cancelled out in the downstream circuit to improve the sensing efficiency. The present disclosure is particularly applicable to various light sensors including a front-side illumination sensor, a back-side illumination sensor and a global shutter sensor.

2. Description of the Related Art

The conventional sensors are affected by environmental noises to degrade the sensing efficiency. Taking a light sensor as an example such as a global shutter sensor, all sensor pixels thereof are exposed at the same time due to their global shutter operation. The exposure data is temporarily stored and then outputted in turn. As the readout time of different pixels has a time difference and the sensing elements are continuously stimulated by external light during the readout interval to generate undesired sensing noises, the exposure data being readout later is influenced more by the sensing noises. As the noises and the exposure data are both charges, once the exposure data is polluted by the noise charges, it is not able to separate the noises from the exposure data to cause the distortion of the image signal, i.e. decreasing the sensing efficiency.

Similar situation also appears in the rolling shutter sensor only with a shorter waiting time interval and thus receiving a smaller influence from the external light.

To solve this problem, the present disclosure provides an improvement on the sensor circuit that duplicates a voltage deviation caused by additional electrons using the capacitive sensing or an adjacent pixel. The voltage deviation is cancelled out in the downstream circuit to improve the sensing efficiency.

SUMMARY

The present disclosure is related to a circuit to improve the pixel sensing efficiency that arranges a capacitor or multiple identical capacitors in the signal path to be coupled to, by the floating effect, charges stored in the floating diffusion node. In this way, the capacitor simultaneously induces a charge variation caused by sensing noises during an interval that a sensing signal is waiting to be readout. And a voltage deviation caused by the sensing noises is cancelled out while reading the sensing signal.

The present disclosure is further related to a circuit to improve the pixel sensing efficiency that arranges two cascaded floating diffusion nodes each being coupled to at least one corresponding capacitor. The capacitors have identical physical characteristics, e.g., identical areas, shapes, doping concentrations and manufacturing procedures. One of the floating diffusion nodes stores a reset signal and the other one floating diffusion node stores a sensing signal. In this way, charges in the region of floating diffusion nodes convert to a voltage to be stored in the corresponding capacitors. When the charges caused by sensing noises induce a voltage deviation, identical influences are formed on these capacitors and cancelled out such that the sensing efficiency is improved.

The present disclosure is further related to a circuit to improve the pixel sensing efficiency that couples one capacitor at a position of a floating diffusion node. One of two electrodes of the capacitor is coupled to the floating diffusion node and the other one electrode is coupled to a following circuit or a reset voltage. Said two electrodes of the capacitor have identical physical characteristics such as identical areas, shapes, doping concentrations and manufacturing procedures. In this way, when the charges caused by sensing noises induce a voltage deviation, identical influences are formed on two terminals of the capacitor and cancelled out such that the sensing efficiency is improved.

The present disclosure is further related to an operating method of a sensor circuit that controls some transistors in a same pixel circuit to be always turned on or turned off from an exposure interval to a readout interval according to the control signal of a row decoder so as to operate in different shutter modes thereby having the effect of reducing the power consumption.

The present disclosure is further related to a sensor circuit that arrange two parallel floating diffusion nodes to cancel out the influence from charges caused by sensing noises to improve the sensing efficiency.

The present disclosure is further related to a sensor circuit that cancels out the influence from charges caused by sensing noises using two floating diffusion nodes of two adjacent pixels thereby improving the sensing efficiency.

The present disclosure provides a sensor circuit includes a photodiode, a first voltage source having a first reset voltage, a second voltage source having a second reset voltage, a capacitor, a sustain transistor and a readout circuit. The capacitor has a first electrode and a second electrode. The first electrode is coupled to a floating diffusion node and has a sensing voltage, generated by the photodiode within an exposure interval, at a start time of a storage interval, and the second electrode has the second reset voltage at the start time of the storage interval, wherein the first and second electrodes have an identical physical characteristic. The sustain transistor is connected between the second electrode of the capacitor and the second voltage source. The readout circuit is configured to read, after the storage interval and when the sustain transistor is conducted, a first readout voltage on the first electrode of the capacitor, read, after the first readout voltage is read and the first electrode of the capacitor is connected to the first voltage source, a second readout voltage on the first electrode of the capacitor, and calculate a voltage between the first readout voltage and the second readout voltage to cancel out a noise voltage generated within the storage interval.

The present disclosure further provides an operating method of a sensor circuit. The sensor circuit includes a photodiode, a reset transistor coupled between the photodiode and a first reset voltage, a capacitor having a first electrode, which is connected to a floating diffusion node, and a second electrode identical to the first electrode, a transfer control transistor coupled between the photodiode and the floating diffusion node, as well as a sustain transistor coupled between the second electrode and a second reset voltage. The operating method includes the steps of: resetting the first electrode to the first reset voltage and resetting the second electrode to the second reset voltage by conducting the reset transistor, the transfer control transistor and the sustain transistor; exposing the photodiode to store a sensing voltage on the floating diffusion node by turning off the reset transistor; storing the sensing voltage on the floating diffusion node in a storage interval within which the reset transistor, the transfer control transistor and the sustain transistor are turned off; reading the sensing voltage from the floating diffusion node after the sustain transistor is turned on but the reset transistor and the transfer control signal are stilled turned off; resetting the first electrode and the second electrode of the capacitor again by conducting the reset transistor, the transfer control transistor and the sustain transistor; and reading the first reset voltage from the floating diffusion node after the reset transistor and the transfer control signal are turned off but the sustain transistor is still conducted.

The present disclosure further provides a sensor circuit includes a photodiode, a capacitor and a sustain transistor. The capacitor has a first electrode and a second electrode. The first electrode is coupled to a floating diffusion node and has a sensing voltage, generated by the photodiode, at a start time of a storage interval. The second electrode has a second reset voltage at the start time of the storage interval, wherein the first electrode and second electrode are identical to each other to receive identical influence from sensing noises within the storage interval. The sustain transistor is connected between the second electrode of the capacitor and the second reset voltage.

The technical means of the present disclosure is also applicable to the sensor circuit that can use the present disclosure to improve the sensing efficiency. Particularly, the present disclosure is applicable to a global shutter sensor since all pixels thereof are exposed within the same interval. The stored sensing signals are readout in turn at different time intervals such that the sensing signals being read out later are affected more by noises. In addition to be applied to a front side sensor, the present disclosure is further applicable to a back side sensor since it has a larger illuminated area that triggers more noises by ambient light.

BRIEF DESCRIPTION OF THE DRAWINGS

Other objects, advantages, and novel features of the present disclosure will become more apparent from the following detailed description when taken in conjunction with the accompanying drawings.

FIG. 1B is an operational schematic diagram of transistors of the sensor circuit in FIG. 1A.

FIG. 6B is an operational schematic diagram of transistors of the sensor circuit in FIG. 6A.

DETAILED DESCRIPTION OF THE EMBODIMENT

It should be noted that, wherever possible, the same reference numbers will be used throughout the drawings to refer to the same or like parts.

One objective of the present disclosure is to use an improved circuit to improve the sensing efficiency by using the induction effect of the capacitor to duplicate a voltage deviation caused by additional electrons and eliminate the voltage deviation in the downstream circuit. In the optical sensor circuit, as charges generated in the exposure interval and not being readout are temporarily stored in the floating diffusion node, accurate exposure data cannot be retrieved once these stored charges are influenced by sensing noises. Accordingly, it is the most important issue to prevent these stored charges from being polluted by the sensing noises. The different embodiments in the present disclosure below may be combined together to achieve superimposed functions.

The technique of the present disclosure is to utilize the feature that a capacitor can generate a voltage deviation while being affected by charges in conjunction with the controllable manufacturing parameter to induce an identical noise voltage on two electrodes of the same capacitor or on multiple capacitors when external sensing noises enter a sensor pixel circuit. Accordingly, the noise voltage is cancelled using a circuit arrangement to improve the sensing efficiency.

Figure 1A:
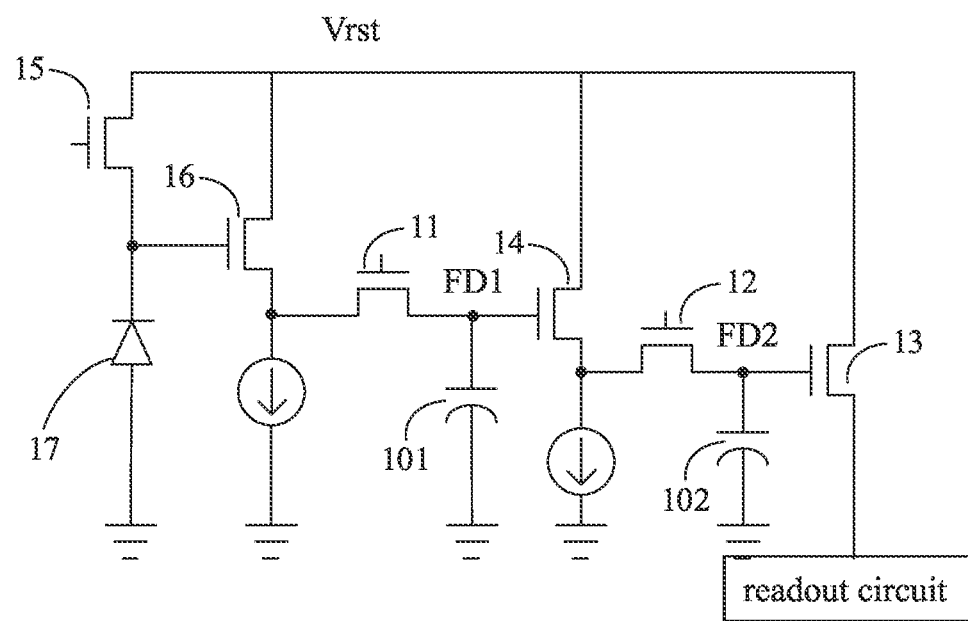
FIG. 1A is a sensor circuit according to a first embodiment of the present disclosure.

FIG. 1A is a sensor circuit according to a first embodiment of the present disclosure that utilizes two identical capacitors 101 and 102 to respectively store a reset signal and a sensing signal within a storage interval. When the sensing noises are generated, said two capacitors 101 and 102 are influenced simultaneously. That is, the reset signal and the sensing signal receive identical influences, and a noise voltage is cancelled out using a downstream circuit during reading these signals to improve the sensing efficiency. Details thereof are further illustrated hereinafter.

Referring to FIG. 1B together, firstly in phase I, a reset transistor 15, a transfer control transistor 11 and a transfer control transistor 12 are conducted (or turned on) such that a reset signal is stored in a capacitor 102 coupled to a second floating diffusion node FD2.

Next in phase II, the reset transistor 15 and the transfer control transistor 12 are turned off, and the transfer control transistor 11 is conducted to start an exposure procedure. Charges generated by a photodiode 17 are transferred to a first floating diffusion node FD1 via the transfer control transistor 11 to store a sensing signal Vsig in the capacitor 101. As the transfer control transistor 12 is turned off, a voltage $V_{FD2}$ at the second floating diffusion node FD2 is Vrst.

In phase III after the exposure, the reset transistor 15, the transfer control transistors 11 and 12 are turned off. Now, a voltage $V_{FD1}$ at the first floating diffusion node FD1 is Vsig, i.e. a voltage amplitude generated by the sensing signal; and $V_{FD2}$=Vrst, i.e. a voltage amplitude generated by the reset signal.

In a storage interval of phase IV during which the stored signals are waiting to be readout, noise charges are generated when FD1 and FD2 are affected by ambient light. As the capacitors 101 and 102 are substantially identical (e.g., including the area, doping and optical angle) to each other, influences on the sensing signal Vsig and the reset signal Vrst from the noise charges are substantially identical. In a case that the noise charges induce a voltage drop Δv, $V_{FD1}$ changes to Vsig−Δv, and $V_{FD2}$ changes to Vrst−Δv in the storage interval.

Next, a readout circuit reads the voltage $V_{FD2}$, i.e. Vrst−Δv, via the transistor 13. Then, in phase V, the transfer control transistor 12 is conducted to cause Vsig−Δv to be transferred to the capacitor 102. The readout circuit then reads the voltage $V_{FD1}$, i.e. Vsig−Δv, via the transistor 13. The downstream circuit (e.g., the readout circuit, but not limited to) calculates a difference between the two readout voltages to obtain Vsig-Vrst to cancel out the noise voltage Δv. The readout circuit has, for example, two capacitors respectively used to store Vrst−Δv and Vsig−Δv before the subtraction operation.

In this embodiment, transistors 13, 14 and 16 are used as simple drive circuits, e.g., source follower transistors, without changing the circuit feature, and thus may be replaced by another equivalent circuit without changing the effect of the present disclosure.

Figure 2A:
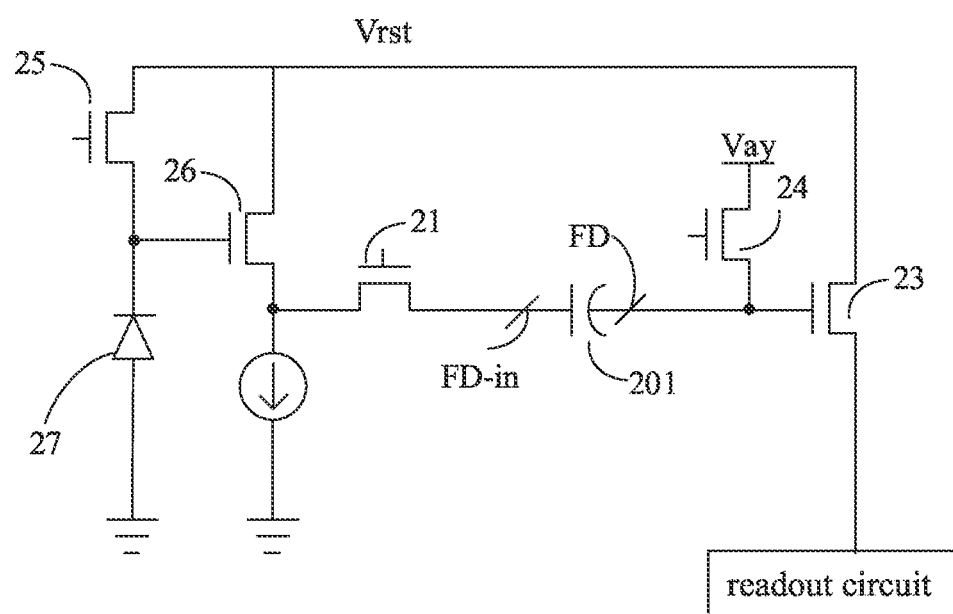
FIG. 2A is a sensor circuit according to a second embodiment of the present disclosure.

FIG. 2A is a sensor circuit according to a second embodiment of the present disclosure that couples one capacitor 201 at a position of a floating diffusion node. One electrode FD-in of two electrodes of the capacitor 201 is coupled to the floating diffusion node, and the other electrode PD is coupled to the downstream circuit. The two electrodes of the capacitor 201 have substantially identical physical characteristics such as identical areas, shapes, doping concentrations and manufacturing procedures. In this way, when sensing noises trigger some variation, identical influences are induced at two ends of the capacitor 201 and are cancelled out in the downstream circuit thereby improving the sensing efficiency. Details thereof are further illustrated hereinafter.

Figures 2B, 2C:
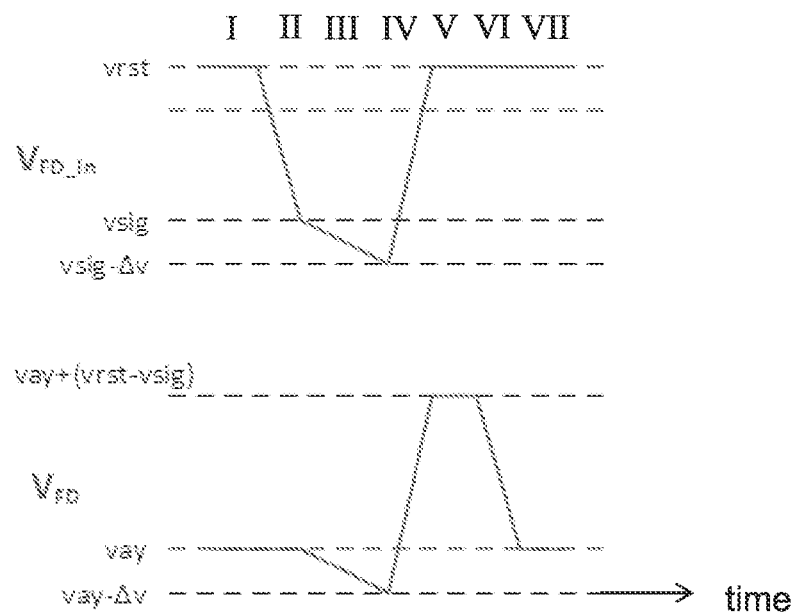
FIG. 2B is an operational schematic diagram of transistors of the sensor circuit in FIG. 2A.
FIG. 2C is a timing diagram of the voltage variation of capacitor electrodes of the sensor circuit in FIG. 2A.

Referring to FIGS. 2B and 2C together, firstly in phase I, a reset transistor 25, a transfer control transistor 21 and a rear reset transistor 24 are conducted (or turned on). Now, a reset signal set a voltage on FD at a reset voltage Vay, and a voltage on FD-in is set at Vrst.

Next in phase II, the reset transistor 25 is turned off, and the transfer control transistor 21 and the rear reset transistor 24 are conducted to start an exposure procedure. The voltage at FD-in node fluctuates with that of the photodiode 27, and induced charges accumulate in FD-in node via the transfer control transistor 21 to cause the voltage at PD-in node to change from Vrst to a sensing voltage Vsig. Meanwhile, as the rear reset transistor 24 is still conducted, the voltage at PD node is still kept at the reset voltage Vay.

After the exposure, the reset transistor 25, the transfer control transistor 21 and the rear reset transistor 24 are turned off such that the voltage at FD-in node is Vsig and the voltage at FD node is Vay. More specifically, at a start time of a storage interval, the FD-in node has a voltage Vsig and the FD node has a voltage Vay. In phase III during which the stored signals are waiting to be readout, when voltages at FD-in node and PD node are changed by the effect from ambient light, noise charges give identical influences on the voltages at FD-in node and FD node. In a case that the noise charges cause a voltage drop Δv, the voltage at FD-in node changes to Vsig−Δv, and the voltage at FD node changes to Vay−Δv.

Next, in phase IV, the reset transistor 25 and the transfer control transistor 21 are conducted and the rear reset transistor 24 is turned off. Now, as the FD node is at a floating state, a voltage crossing the capacitor 210 is fixed. When the voltage at FD-in node changes from Vsig−Δv to Vrst, a voltage variation at FD node is identical to the voltage variation at PD-in node and changes from Vay−Δv to Vay+(Vrst−Vsig). The readout circuit then reads a voltage value Vay+(Vrst−Vsig) from FD node in phase V.

Next, in phase VI, the rear reset transistor 24 is conducted to reset the voltage at FD node back to Vay. Meanwhile, as the reset transistor 25 and the transfer control transistor 21 are kept being turned on, the PD-in node is kept at Vrst. The readout circuit reads a voltage value Vay from FD node in phase VII.

Finally, a downstream circuit, e.g., the readout circuit, performs a subtraction between the two read voltages to obtain a value Vrst−Vsig thereby cancelling out the noise voltage Δv.

In this embodiment, transistors 23 and 26 are used as simple drive circuits, e.g., source follower transistors, without changing the circuit feature, and thus may be replaced by another equivalent circuit without changing the effect of the present disclosure.

Figure 3A:
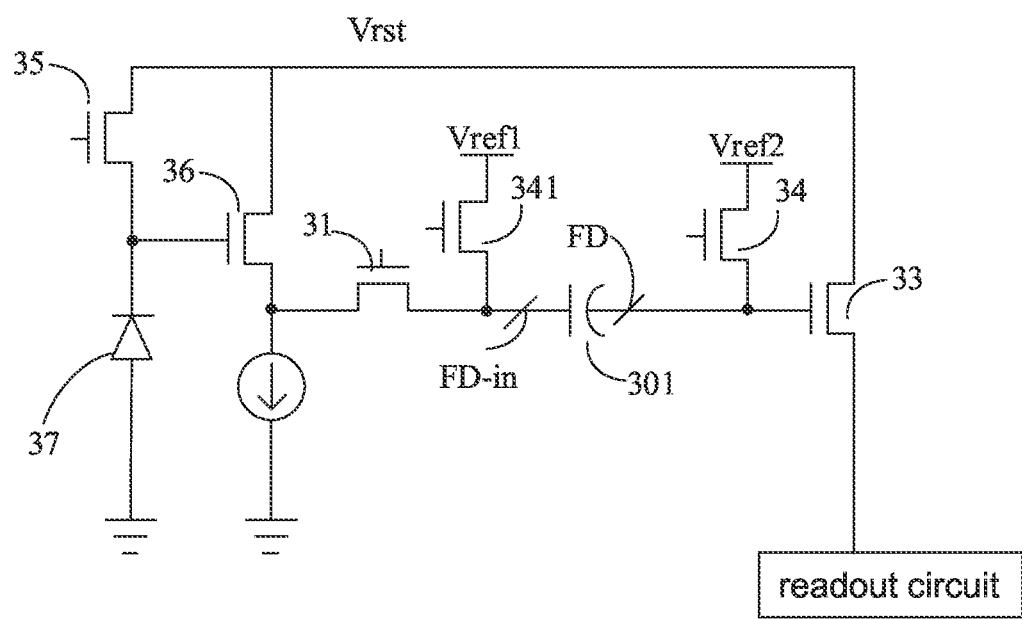
FIG. 3A is a sensor circuit according to a third embodiment of the present disclosure.

FIG. 3A is a sensor circuit according to a third embodiment of the present disclosure that arranges a capacitor 301 at a position of a floating diffusion node. One electrode FD-in of two electrodes of the capacitor 301 is coupled to the floating diffusion node and the other electrode FD is coupled to a downstream circuit thereof. The two electrodes of the capacitor 301 have substantially identical physical characteristics such as identical areas, shapes, doping concentrations and manufacturing procedures. In this way, when sensing noises trigger some variation, identical influences are induced at two ends of the capacitor 301 and are cancelled out in the downstream circuit thereby improving the sensing efficiency. The difference between the third embodiment and second embodiment is that the FD-in node is further coupled to a dump transistor 341, which is coupled between a reset voltage source Vref1 and a left electrode of the capacitor 301. Details thereof are further described hereinafter.

Figures 3B, 3C:
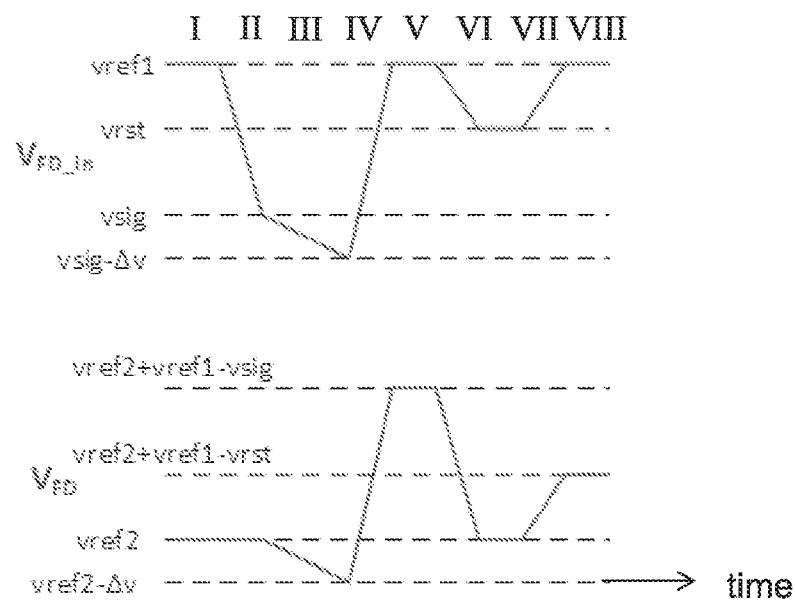
FIG. 3B is an operational schematic diagram of transistors of the sensor circuit in FIG. 3A.
FIG. 3C is a timing diagram of the voltage variation of capacitor electrodes of the sensor circuit in FIG. 3A.

Referring to FIGS. 3B and 3C together, firstly a reset transistor 35, a transfer control transistor 31, a dump transistor 341 and a rear reset transistor 34 are conducted (or turned on), and thus the reset voltage sets a voltage at FD node at a reset voltage Vref2, and a voltage at FD-in node is set at a reset voltage Vref1.

Next, in phase II, the reset transistor 35 and the dump transistor 341 are turned off, and the transfer control transistor 31 and the rear reset transistor 34 are conducted to start an exposure procedure. The voltage at FD-in node fluctuates with the voltage of photodiode 37, and induced charges accumulate at PD-in node via the transfer control transistor 31 to cause a voltage at FD-in node to change to a sensing voltage Vsig. As the rear reset transistor 34 is still conducted in this phase, a voltage at FD node is still kept at the reset voltage Vref2.

After the exposure, the reset transistor 35, the transfer control transistor 31, the dump transistor 341 and the rear reset transistor 34 are turned off. Now, a voltage at FD-in node is Vsig and a voltage at PD node is Vref2. More specifically, at a start time of a storage interval, the voltage at FD-in node is Vsig and the voltage at FD node is Vref2. In phase III during which the stored signals are waiting to be readout, when voltages at FD-in node and FD node are changed due to the effect from ambient light, the influences giving to the voltages at FD-in node and FD node are identical. In a case that noise charges causes a voltage drop $\Delta v$, the voltage at PD-in node changes to Vsig$-\Delta v$, and the voltage at FD node changes to Vref2-$\Delta v$.

Next, in phase IV, the dump transistor 341 is conducted and as the PD node is in a floating state, the voltage crossing the capacitor 301 is fixed. When the voltage at FD-in node changes from Vsig$-\Delta v$ to Vref1, a voltage variation at FD node is identical to that at PD-in node to change from Vref2-$\Delta v$ to Vref2+(Vref1$-$Vsig). The readout circuit reads a voltage value Vref2+(Vref1$-$Vsig) via the transistor 33 from PD node in phase V.

Next, in phase VI, the dump transistor 341 is turned off, and the reset transistor 35, the transfer control transistor 31 and the rear reset transistor 34 are turned on to reset the voltage at FD node back to Vref2 and change the voltage at PD-in node to Vrst.

In next phase VII, the reset transistor 35 and the dump transistor 341 are turned on, and the transfer control transistor 31 and the rear reset transistor 34 are turned off. In this phase, as the FD node is in a floating state, the voltage crossing the capacitor 301 is fixed. When the voltage at FD-in node changes to Vref1 from Vrst, a voltage variation at FD node is identical to that at FD-in node and changes from Vref2 to Vref2+(Vref1$-$Vrst). The readout circuit reads a voltage value Vref2+(Vref1$-$Vrst) from FD node via the transistor 33 in phase VIII.

Finally, a downstream circuit, e.g., the readout circuit, performs a subtraction between the two read voltages to obtain a value Vrst$-$Vsig. It is clear that the noise voltage $\Delta v$ is cancelled out.

In this embodiment, transistors 33 and 36 are used as simple drive circuits, e.g., source follower transistors, without changing the circuit feature, and thus may be replaced by another equivalent circuit without changing the effect of the present disclosure.

Figure 4A:
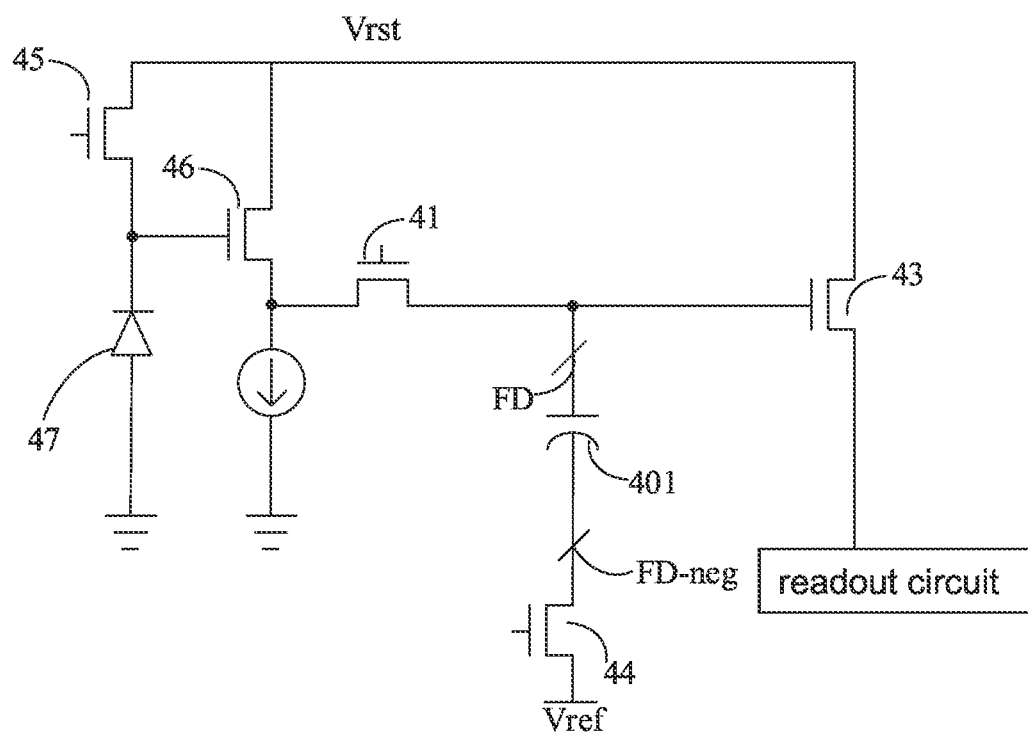
FIG. 4A is a sensor circuit according to a fourth embodiment of the present disclosure.

FIG. 4 is a sensor circuit according to a fourth embodiment of the present disclosure that couples one capacitor 401 at a position of a floating diffusion node. One electrode FD of two electrodes of the capacitor 401 is coupled to the floating diffusion node, and the other electrode FD-neg is coupled to the source/drain of a sustain transistor 44 which is coupled to a reset voltage Vref. The two electrodes of the capacitor 401 have substantially identical physical characteristics such as identical areas, shapes, doping concentrations and manufacturing procedures. In this way, when sensing noises trigger some variation, identical influences are induced at two ends of the capacitor 401 and are cancelled out in the downstream circuit thereby improving the sensing efficiency. Details thereof are further illustrated hereinafter.

Figures 4B, 4C:
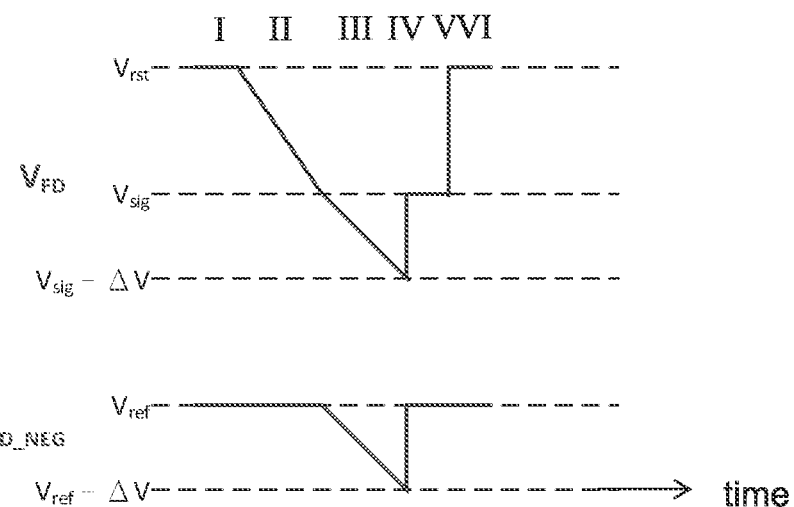
FIG. 4B is an operational schematic diagram of transistors of the sensor circuit in FIG. 4A.
FIG. 4C is a timing diagram of the voltage variation of capacitor electrodes of the sensor circuit in FIG. 4A.

Referring to FIGS. 4B and 4C together, firstly in phase I, a reset transistor 45, a transfer control transistor 41 and a sustain transistor 44 are conducted (or turned on), and the reset signal sets a voltage at FD node at a reset voltage Vrst and a voltage at FD-neg node is set at Vref.

Next, in an exposure interval of phase II, the reset transistor 45 is turned off, and the transfer control transistor 41 and the sustain transistor 44 are conducted to start an exposure procedure. The voltage at PD node fluctuates with that of photodiode 47, and induced charges accumulate in FD node via the transfer control transistor 41 to cause the voltage at FD node to change from Vrst (or Vrst$-$va if a coupling voltage Va of the reset transistor 45 is considered) at the start of the exposure to Vsig within the exposure interval. As the sustain transistor 44 is conducted, the voltage at FD-neg node is kept at Vref.

After the exposure, the reset transistor 45, the transfer control transistor 41 and the sustain transistor 44 are turned off. Now, a voltage of FD node is Vsig (or Vsig-va if a coupling voltage Va of the reset transistor 45 is considered), and a voltage of FD-neg node is Vref. That is, at the end of the exposure interval and at a start time of a storage interval, the voltage at FD node is Vsig and the voltage at FD-neg node is Vref. In phase III during which the stored signals are waiting to be readout, when voltages at FD node and FD-neg node are changed due to the effect from ambient light, noise charges give identical influences on the voltages at PD node and FD-neg node. In a case that the noise charges cause a voltage drop $\Delta v$, the voltage at PD node changes to Vsig$-\Delta v$ (or Vsig-va-$\Delta v$ if a coupling voltage Va of the reset transistor 45 is considered), and the voltage at FD-neg node changes to Vref$-\Delta v$.

Next, in phase IV, the reset transistor 45 and the transfer control transistor 41 are turned off, and the sustain transistor 44 is conducted. At the time that the sustain transistor 44 is conducted, the voltage at FD-neg node changes from Vref$-\Delta v$ to Vref. As the voltage crossing the capacitor 401 does not change immediately, a voltage variation of the FD node is identical to that of the FD-neg node and changes from Vsig$-\Delta v$ to Vsig. Then, the readout circuit reads a voltage value Vsig via the transistor 43.

Then, in phase V, the reset transistor 45 and the transfer control transistor 41 are conducted to reset the voltage at FD node back to Vrst. In phase VI, the reset transistor 45 and the transfer control transistor 41 are turned off, and the readout circuit reads a voltage value Vrst from FD node via the transistor 43. Finally, a downstream circuit, e.g., the readout circuit, performs a subtraction between the two read voltages to obtain a value Vrst$-$Vsig thereby cancelling out the noise voltage $\Delta v$.

In this embodiment, transistors 43 and 46 are used as simple drive circuits, e.g., source follower transistors, without changing the circuit feature, and thus may be replaced by another equivalent circuit without changing the effect of the present disclosure.

Figures 5A, 5B:
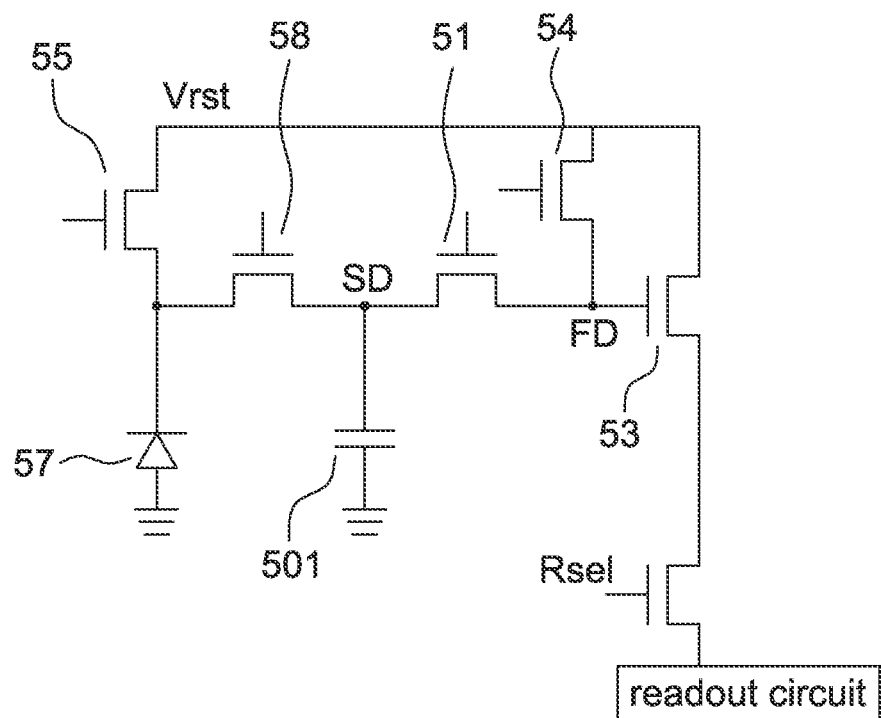
FIG. 5A is a sensor circuit according to a fifth embodiment of the present disclosure.
FIG. 5B is an operational schematic diagram of transistors of the sensor circuit in FIG. 5A operating in different modes.

Referring to FIG. 5A, it is a sensor circuit according to a fifth embodiment of the present disclosure that always turns on/off a transfer control transistor 51, a rear reset transistor 54 or a global shutter transistor 58 from a pixel starting to operate (e.g., resetting a photodiode thereof) till pixel data being readout so as to operate in different shutter modes. The transistor 53 is used as a simple drive circuit, e.g., a source follower transistor, without changing the circuit feature, and thus may be replaced by another equivalent circuit without changing the effect of the present disclosure. The connection of every element is shown in FIG. 5A.

Referring to FIG. 5B together, for example in a mode of global shutter image sensor (e.g., referred to a first mode herein) using the correlated double sampling (CDS) technique, exposure data of the photodiode 57 is stored in a capacitor 501 to form an exposure voltage Vsig when a global shutter transistor 58 is conducted. After the pixel shown in FIG. 5A is selected by a row decoder (e.g., using a row selection signal Rsel), a readout circuit respectively read a reset voltage Vrst and the exposure voltage Vsig by sequentially turning on the rear reset transistor 54 and the transfer control transistor 51, i.e. the reset voltage Vrst being stored in PD when the rear reset transistor 54 is turned on (turning off the transfer control transistor 51) to be read by the readout circuit, and the exposure voltage Vsig transfers from SD to PD when the transfer control transistor 51 is turned on (turning off the rear reset transistor 54) to be read by the readout circuit. For example, the readout circuit includes two capacitors used to respectively store the reset voltage Vrst and the exposure voltage Vsig.

For example, in a mode of rolling shutter image sensor (e.g., referred to a second mode herein) using the correlated double sampling (CDS) technique, the global shutter transistor 58 is always turned on, i.e. not being switched during operation. In an exposure interval, exposure data of the photodiode 57 is stored in the capacitor 510 to form an exposure voltage Vsig. After the pixel shown in FIG. 5A is selected by a row decoder (e.g., using a row selection signal Rsel), the readout circuit respectively read a reset voltage Vrst and the exposure voltage Vsig by sequentially turning on the rear reset transistor 54 and the transfer control transistor 51, similar to that mentioned in the first mode. Similarly, the readout circuit includes two capacitors used to respectively store the reset voltage Vrst and the exposure voltage Vsig.

For example, in a 5T (five transistors) mode of a global shutter image sensor (e.g., referred to a third mode herein), the transfer control transfer 51 is always conducted. In an exposure interval, exposure data of the photodiode 57 is stored in the floating diffusion node FD to form an exposure voltage Vsig when the global shutter transistor 58 is conducted. After the pixel shown in FIG. 5A is selected by a row decoder (e.g., using a row selection signal Rsel), the readout circuit respectively read the exposure voltage Vsig and a reset voltage Vrst by sequentially turning on the global shutter transistor 58 and the rear reset transistor 54, i.e. the exposure voltage Vsig being stored in PD when the global shutter transistor 58 is turned on (turning off the rear reset transistor 54) to be read by the readout circuit, and the reset voltage Vrst being stored in FD when the rear reset transistor 54 is turned on (turning off the global shutter transistor 58) to be read by the readout circuit. Similarly, the readout circuit includes two capacitors used to respectively store the exposure voltage Vsig and the reset voltage Vrst.

For example, in a 3T (three transistors) mode of a rolling shutter image sensor (e.g., referred to a fourth mode herein), the transfer control transistor 51 and the global shutter transistor 58 are always turned on, and the rear reset transistor 54 is always turned off, i.e., not being switched during operation. In an exposure interval, exposure data of the photodiode 57 is stored in the floating diffusion node FD to form an exposure voltage Vsig. After the pixel shown in FIG. 5A is selected by a row decoder (e.g., using a row selection signal Rsel), the readout circuit respectively read a reset voltage Vrst by turning on the reset transistor 54 and read the exposure voltage Vsig by turning off the reset transistor 54. Similarly, the readout circuit includes two capacitors used to respectively store the reset voltage Vrst and the exposure voltage Vsig.

In this embodiment, the same circuit is operated to enter different shutter modes by always turning on/off a part of transistors during an operation interval of one pixel.

Figure 6A:
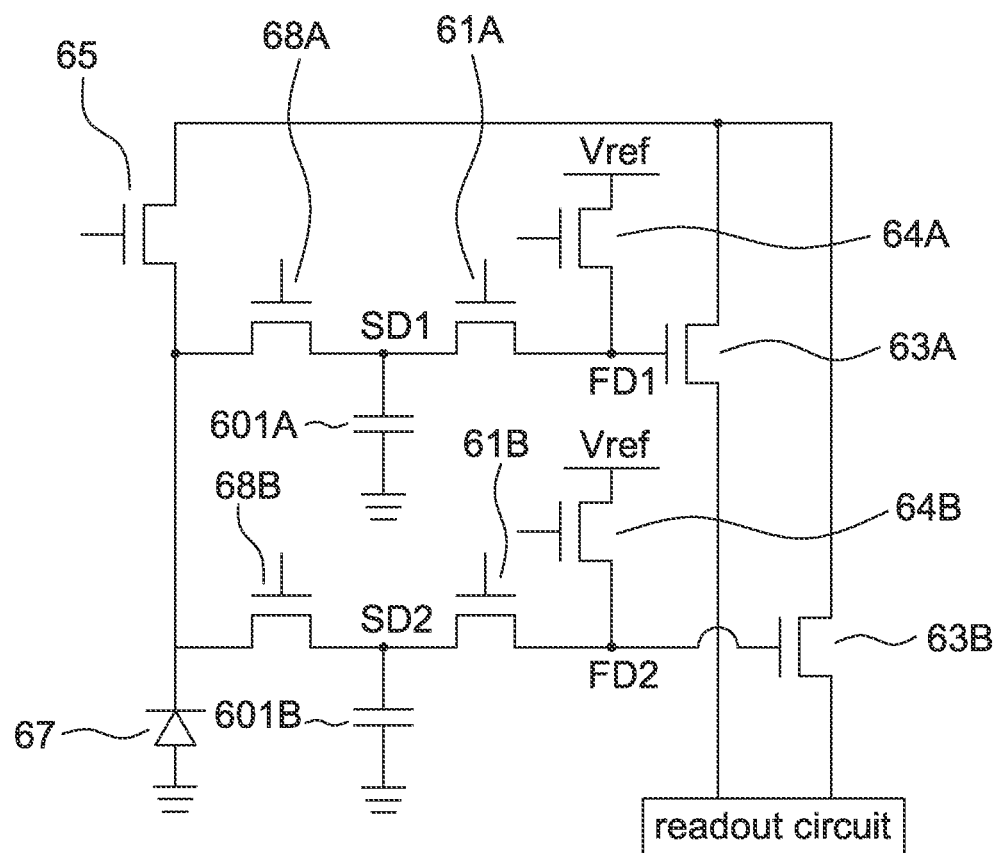
FIG. 6A is a sensor circuit according to a sixth embodiment of the present disclosure.

Referring to FIG. 6A, it is a sensor circuit according to a sixth embodiment of the present disclosure that arranges two floating diffusion nodes FD1 and 1-D2 in one pixel. Different double sampled signals are read using the timing control, and the downstream circuit (e.g., a readout circuit) performs the subtraction calculation on these double sampled signals to cancel out the noise voltage thereby improving the sensing efficiency.

Referring to FIG. 6B together, an exemplary operating sequence of this embodiment is illustrated hereinafter.

In phase I, a reset transistor 65 is conducted to clear charges in a photodiode 67. The voltage source Vref is set at a low level, and the rear reset transistors 64A and 64B are conducted but the transistors 63A and 63B are not turned on.

In phase II, the reset transistor 65 is turned off, and charges are accumulated by exposing the photodiode 67. The voltage source Vref is still kept at the low level, and the transistors 63A and 63B are not turned on.

In phase III, the transfer control transistors 61A and 61B are conducted, and the voltage source Vref is converted to a high level to reset voltages of storage diodes SD1 and SD2 to Vref.

In phase IV, the global shutter transistor 68B is conducted to transfer (or dump) the charges of the photodiode 67 to the capacitor 601B to cause the capacitor 601B to store a sensing signal Vsig. Meanwhile, as the global shutter transistor 68A is not conducted, the capacitor 601A still stores the reset signal Vref. In this embodiment, the capacitors 601A and 601B are coupled to the same photodiode 67.

In phase V during which the stored signals are waiting to be readout, SD1 and SD2 are affected by ambient light to generate noise charges. As the capacitors 601A and 601B are substantially identical (e.g., including the area, doping and optical angle) to each other, the influences on Vsig and Vref from the noise charges are substantially identical. In a case that the noise charges induce a voltage drop $\Delta v$, the voltage $V_{SD1}$ of the capacitor 601A changes to Vref–$\Delta v$, and the voltage $V_{SD2}$ of the capacitor 601B $V_{SD2}$ changes to Vsig–$\Delta v$.

In phase VI, the voltage source Vref is kept at the high level to reset voltages of the floating diffusion nodes PD1 and FD2 at Vref.

In phase VII, a readout circuit reads the voltage Vref from the floating diffusion nodes FD1 and FD2 respectively via the transistors 63A and 63B. The readout circuit includes, for example, two capacitors to respectively store the voltages Vref from the floating diffusion nodes FD1 and FD2.

In phase VIII, the transfer control transistors 61A and 61B are conducted to transfer (or dump) charges in SD1 and SD2 respectively to the floating diffusion nodes FD1 and FD2 to cause the floating diffusion nodes 1-D1 and FD2 to respectively have stored signals Vref–$\Delta v$ and Vsig–$\Delta v$ after a storage interval, wherein $\Delta v$ is a voltage deviation caused by ambient light within the storage interval.

In phase IX, the readout circuit reads the stored signals Vref–$\Delta v$ and Vsig–$\Delta v$ from the floating diffusion nodes FD1 and FD2 respectively via the transistors 63A and 63B.

As mentioned above, the readout circuit sequentially reads a reference reset signal Vref and a stored signal Vref–$\Delta v$ from the floating diffusion node FD1, and sequentially reads a reference reset signal Vref and a stored signal Vsig–$\Delta v$ from the floating diffusion node FD2. The downstream circuit thereof performs the subtraction between the two read voltages to obtain double sampled signals $\Delta v$ (i.e. Vref–Vref+$\Delta v$) and Vref–Vsig+$\Delta v$. The downstream circuit further performs a subtraction between the two double sampled signals to obtain Vrst−Vsig. It is seen that the noise voltage Δv is cancelled by the subtraction.

The operations of every transistor in different phases of the sixth embodiment are shown in FIG. 6B, and the connection between every element in shown in FIG. 6A.

Figure 7:
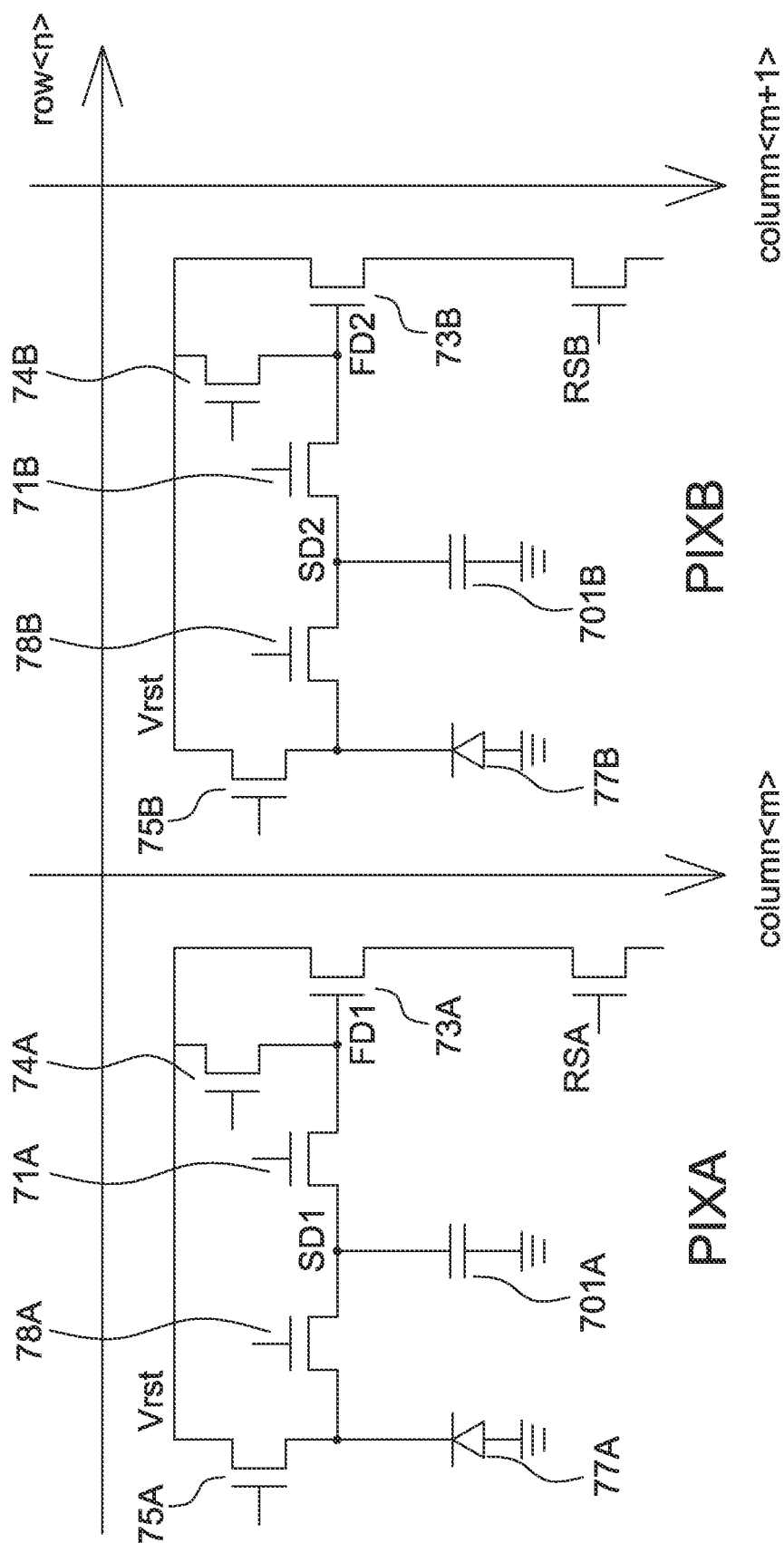
FIG. 7 is a sensor circuit according to a seventh embodiment of the present disclosure.

Referring to FIG. 7, it is a sensor circuit according to a seventh embodiment of the present disclosure. In this embodiment, the noise voltage Δv is cancelled out using adjacent pixels, e.g., two adjacent pixels PIXA and PIXB shown in FIG. 7. Firstly, a readout circuit reads a reference reset signal Vrst (resetting the floating diffusion node FD1 by conducting a rear reset transistor 74A) of the floating diffusion node FD1 via a readout line of column <m>, and reads a reference reset signal Vrst (resetting the floating diffusion node FD2 by conducting a rear reset transistor 74B) of the floating diffusion node FD2 via a readout line of column <m+1>. A reset transistor 75A is used to reset the photodiode 77A.

Next in an exposure interval, the capacitor 701A of pixel PIXA stores a sensing signal Vsig generated by the photodiode 77A (accumulating by conducting the global shutter transistor 78A); meanwhile, the reset transistor 75B in pixel PIXB is continuously turned on or the global shutter transistor 78B in pixel PIXB is continuously turned off to cause the capacitor 701B stores a reset signal Vrst, i.e., the capacitor 701B not storing the sensing signal from the photodiode 77B.

In a storage interval during which the charges are stored in the capacitors 701A and 701B but are not readout, a voltage variation Δv is induced due to the influence from ambient light. As the capacitors 701A and 701B are substantially identical (including area, doping and optical angle) to each other, the influences on Vsig and Vrst from noise charges are substantially identical. In a case that the noise charges induce a voltage drop Δv, the stored signals in the capacitors 701A and 701B respectively change to Vsig−Δv and Vrst−Δv after the storage interval.

Next, the readout circuit reads the temporarily stored signal Vsig−Δv (transferring by conducting a transfer control transistor 71A) at the floating diffusion node FD1 via <m> readout line, and reads the temporarily stored signal Vrst−Δv (transferring by conducting a transfer control transistor 71B) at the floating diffusion node FD2 via <m+1> readout line. The downstream circuit (e.g., the readout circuit) calculates a double sampled signal Vrst−Vsig+Δv of pixel PIXA and a double sampled signal Vrst−Vrst+Δv of pixel PIXB, e.g., by subtracting the stored signal from the reference reset signal. The two double sampled signals are calculated using a circuit, e.g., the readout circuit, to obtain a value Vrst−Vsig to cancel out the noise voltage Δv thereby improving the sensing efficiency.

In this embodiment, transistors 73A and 73B are used as simple drive circuits, e.g., source follower transistors, without changing the circuit feature, and thus may be replaced by another equivalent circuit without changing the effect of the present disclosure.

Figure 8:
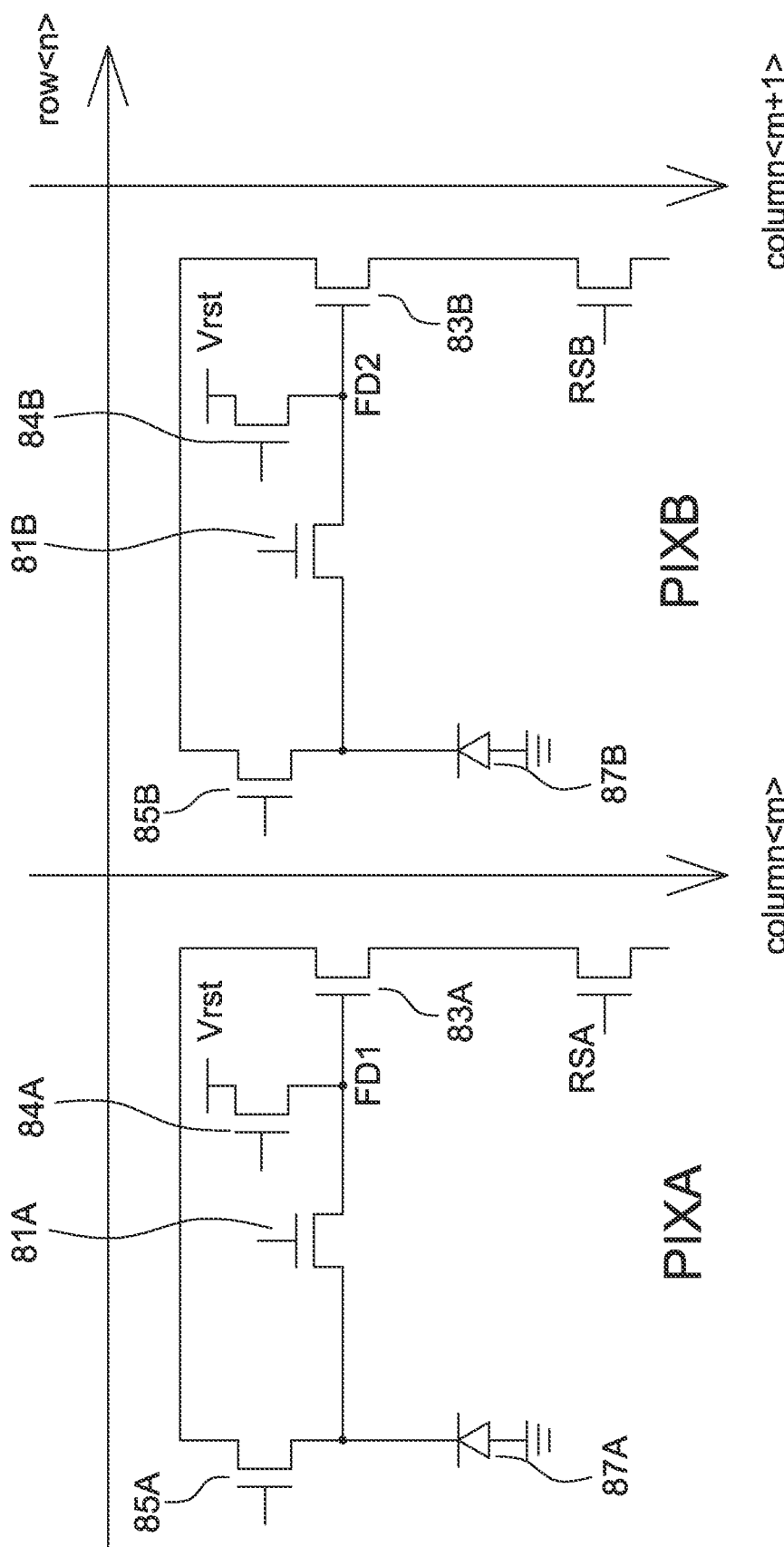
FIG. 8 is a sensor circuit according to an eighth embodiment of the present disclosure.

Referring to FIG. 8, it is a sensor circuit according to an eighth embodiment of the present disclosure. In this embodiment, the noise voltage Δv is also cancelled out using adjacent pixels, e.g., two adjacent pixels PIXA and PIXB shown in FIG. 8. Firstly, a readout circuit reads a reference reset signal Vrst (resetting the floating diffusion node FD1 by conducting a rear reset transistor 84A) of the floating diffusion node FD1 via a readout line of column <m>, and reads a reference reset signal Vrst (resetting the floating diffusion node FD2 by conducting a rear reset transistor 84B) of the floating diffusion node FD2 via a readout line of column <m+1>. A reset transistor 85A is used to reset the photodiode 87A.

Next in an exposure interval, the floating diffusion node FD1 of pixel PIXA stores a sensing signal Vsig of the photodiode 87A (accumulating by conducting a global shutter transistor 81A); meanwhile, the reset transistor 85B and the transfer control transistor 81B in pixel PIXB are continuously turned on to cause the floating diffusion node FD2 to store a reset signal Vrst, i.e., the floating diffusion node FD2 not storing the sensing signal from the photodiode 87B.

In a storage interval during which the charges are stored in the floating diffusion node FD1 and FD2 but are not readout, a voltage variation Δv is induced due to the influence from ambient light. As FD1 and FD2 are substantially identical to each other, the influences on Vsig and Vrst from noise charges are substantially identical. In a case that the noise charges induce a voltage drop Δv, the stored signals in the floating diffusion node FD1 and FD2 respectively change to Vsig−Δv and Vrst−Δv after the storage interval.

Next, the readout circuit reads the stored signal Vsig−Δv at the floating diffusion node FD1 via <m> readout line, and reads the stored signal Vrst−Δv at the floating diffusion node FD2 via <m+1> readout line. The downstream circuit (e.g., the readout circuit) calculates a double sampled signal Vrst−Vsig+Δv of pixel PIXA and a double sampled signal Vrst−Vrst+Δv of pixel PIXB, e.g., by subtracting the stored signal from the reference reset signal. The two double sampled signals are calculated using a circuit, e.g., the readout circuit, to obtain a value Vrst−Vsig to cancel out the noise voltage Δv thereby improving the sensing efficiency.

In this embodiment, transistors 83A and 83B are used as simple drive circuits, e.g., source follower transistors, without changing the circuit feature, and thus may be replaced by another equivalent circuit without changing the effect of the present disclosure.

In FIGS. 7 and 8, as two columns of pixels operate simultaneously, the valid number of columns of a sensor array is reduced to a half of the total pixel columns of the sensor array, i.e. a half of pixels not for generating sensing signals. The sensor array includes a plurality of pixel circuits, e.g., PIXA and PIXB, arranged in a matrix.

It should be mentioned that although FIGS. 7 and 8 show the operation performed by two adjacent pixel columns, the present disclosure is not limited thereto. In other embodiments, the pixels PIXA and PIXB are two pixel columns not directly adjacent to each other, are adjacent two pixel rows or are two pixel rows not directly adjacent to each other.

In the present disclosure, it is assumed that the sensing signal and the reset signal being stored within a storage interval are affected by the noise voltage such that the temporarily stored sensing signal is not equal to the original sensing signal, and the temporarily stored reset signal is not equal to the original reset signal.

The different phases mentioned in the above embodiments are referred to different time intervals of the pixel operation. The transistors mentioned above all have a coupling voltage Va that is known to the art and thus details thereof are not described herein.

As mentioned above, the technical means of the present disclosure is applicable to a sensor circuit that uses a node to temporarily store charges. Although the above embodiments are illustrated by using a photodiode that receives light beams and generates charges, the present disclosure is also applicable to other sensor circuits to improve the node voltage polluted by noises.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A sensor circuit, comprising:
 a photodiode;
 a first voltage source having a first reset voltage;
 a second voltage source having a second reset voltage;
 a capacitor having a first electrode and a second electrode, the first electrode coupled to a floating diffusion node and having a sensing voltage, generated by the photodiode within an exposure interval, at a start time of a storage interval, and the second electrode having the second reset voltage at the start time of the storage interval, wherein the first and second electrodes have an identical physical characteristic;
 a sustain transistor connected between the second electrode of the capacitor and the second voltage source; and
 a readout circuit configured to
  read, after the storage interval and when the sustain transistor is conducted, a first readout voltage on the first electrode of the capacitor,
  read, after the first readout voltage is read and the first electrode of the capacitor is connected to the first voltage source, a second readout voltage on the first electrode of the capacitor, and
  calculate a voltage difference between the first readout voltage and the second readout voltage to cancel out a noise voltage generated within the storage interval.

2. The sensor circuit as claimed in claim 1, wherein within the exposure interval, the sustain transistor is conducted to maintain the second electrode of the capacitor to the second reset voltage.

3. The sensor circuit as claimed in claim 1, wherein the first and second electrodes have identical areas, shapes and doping concentration.

4. The sensor circuit as claimed in claim 1, further comprising:
 a reset transistor, coupled between the photodiode and the first voltage source; and
 a transfer control transistor, coupled between the photodiode and the floating diffusion node.

5. The sensor circuit as claimed in claim 4, wherein
 the reset transistor and the transfer control transistor are turned on within the exposure interval, and
 the reset transistor and the transfer control transistor are turned off within the storage interval.

6. The sensor circuit as claimed in claim 4, further comprising:
 a first source follower transistor coupled between the photodiode and the transfer control transistor; and
 a second source follower transistor coupled between the floating diffusion node and the readout circuit.

7. An operating method of a sensor circuit, the sensor circuit comprising a photodiode, a reset transistor coupled between the photodiode and a first reset voltage, a capacitor having a first electrode, which is connected to a floating diffusion node, and a second electrode identical to the first electrode, a transfer control transistor coupled between the photodiode and the floating diffusion node, as well as a sustain transistor coupled between the second electrode and a second reset voltage, the operating method comprising:
 resetting the first electrode to the first reset voltage and resetting the second electrode to the second reset voltage by conducting the reset transistor, the transfer control transistor and the sustain transistor;
 exposing the photodiode to store a sensing voltage on the floating diffusion node by turning off the reset transistor;
 storing the sensing voltage on the floating diffusion node in a storage interval within which the reset transistor, the transfer control transistor and the sustain transistor are turned off;
 reading the sensing voltage from the floating diffusion node after the sustain transistor is turned on but the reset transistor and the transfer control signal are stilled turned off;
 resetting the first electrode and the second electrode of the capacitor again by conducting the reset transistor, the transfer control transistor and the sustain transistor; and
 reading the first reset voltage from the floating diffusion node after the reset transistor and the transfer control signal are turned off but the sustain transistor is still conducted.

8. The operating method as claimed in claim 7, wherein the first electrode and second electrode have identical areas, shapes and doping concentration.

9. The operating method as claimed in claim 7, further comprising:
 calculating a voltage difference between the read sensing voltage and the read first reset voltage.

10. A sensor circuit, comprising:
 a photodiode;
 a capacitor having a first electrode and a second electrode, the first electrode coupled to a floating diffusion node and having a sensing voltage, generated by the photodiode, at a start time of a storage interval, and the second electrode having a second reset voltage at the start time of the storage interval, wherein the first electrode and second electrode are identical to each other to receive identical influence from sensing noises within the storage interval;
 a sustain transistor connected between the second electrode of the capacitor and the second reset voltage; and
 a readout circuit configured to be connected to the floating diffusion node and the first electrode of the capacitor to read a voltage on the floating diffusion node.

11. The sensor circuit as claimed in claim 10, wherein the first electrode and second electrode have identical areas, shapes and doping concentration.

12. The sensor circuit as claimed in claim 10, further comprising:
 a reset transistor, coupled between the photodiode and a first reset voltage; and
 a transfer control transistor, coupled between the photodiode and the floating diffusion node.

13. The sensor circuit as claimed in claim 12, wherein the reset transistor, the transfer control transistor and the sustain transistor are all turned off within the storage interval.

14. The sensor circuit as claimed in claim 13, wherein the readout circuit is configured to
 read the voltage on the floating diffusion node for a first time when the sustain transistor is turned on after the storage interval, and
 read the voltage on the floating diffusion node for a second time after the voltage on the floating diffusion node is reset to the first reset voltage.

15. The sensor circuit as claimed in claim 14, wherein the readout circuit is further configured to calculate a voltage difference between the firstly read voltage and the secondly read voltage from the floating diffusion node to cancel out the influence from the sensing noises.

* * * * *